United States Patent
Hufferd

(10) Patent No.: US 7,966,380 B2
(45) Date of Patent: *Jun. 21, 2011

(54) METHOD, SYSTEM, AND PROGRAM FOR FORWARDING MESSAGES BETWEEN NODES

(75) Inventor: John Lewis Hufferd, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/781,752

(22) Filed: May 17, 2010

(65) Prior Publication Data

US 2010/0220740 A1    Sep. 2, 2010

Related U.S. Application Data

(63) Continuation of application No. 10/893,708, filed on Jul. 16, 2004, now Pat. No. 7,779,081.

(51) Int. Cl.
G06F 15/167 (2006.01)
(52) U.S. Cl. .......................... 709/212; 709/238; 709/246
(58) Field of Classification Search .......... 709/212–219, 709/230, 238, 246; 370/466
See application file for complete search history.

(56) References Cited

U.S. PATENT DOCUMENTS

| | | | |
|---|---|---|---|
| 5,495,614 A | 2/1996 | Brent et al. | |
| 6,032,224 A | 2/2000 | Blumenau | |
| 6,339,594 B1* | 1/2002 | Civanlar et al. | 370/352 |
| 6,360,282 B1 | 3/2002 | Langerman et al. | |
| 6,374,248 B1 | 4/2002 | Nazari | |
| 6,415,329 B1* | 7/2002 | Gelman et al. | 709/245 |
| 6,584,093 B1* | 6/2003 | Salama et al. | 370/351 |
| 6,757,731 B1 | 6/2004 | Barnes et al. | |
| 6,760,343 B1* | 7/2004 | Krishnamurthy et al. | 370/466 |
| 6,766,375 B2 | 7/2004 | Hadland | |
| 6,885,658 B1* | 4/2005 | Ress et al. | 370/352 |
| 6,978,364 B1 | 12/2005 | Balaz et al. | |
| 6,983,303 B2 | 1/2006 | Pellegrino et al. | |
| 7,043,578 B2 | 5/2006 | Hufferd | |
| 7,136,930 B1* | 11/2006 | Leppinen | 709/238 |
| 7,299,266 B2 | 11/2007 | Boyd et al. | |
| 7,360,233 B2* | 4/2008 | Russ et al. | 725/118 |
| 7,475,153 B2 | 1/2009 | Hufferd | |

(Continued)

OTHER PUBLICATIONS

Chu, H.K.J. and V. Kashyap, "Transmission of IP over InfiniBand", Working document of the Internet Engineering Task Force (IETF), [online], Jan. 2004, [Retrieved on Jun. 3, 200], retrieved from the Internet at <RUL: http://www.ietf.org/internet-drafts/draft-ietf-ipoib-ip-over-infiniband-06.txt>, 18 pp.

Culley, P., U. Elzur, R. Recio, S. Bailey, et al., "Marker PDU Aligned Framing for TCP Specification (Version 1.0)", Release Specification of the RDMA Consortium, Oct. 25, 2002, 32 pp.

Infiniband Trade Association, "InfiniBand Architecture Release 1.1", Specification vol. 1, Final, Nov. 6, 2002, 1303 pp.

Kashyap, V. "IP Over InfiniBand: Connected Mode", Working Document of the Internet Engineering Task Force (IETF), [online], Sep. 2003, [Retrieved on Jun. 13, 2004], retrieved from the Internet at <URL: http://www.watersprings.org/pub/id/draft-kashyap-ipoib-connected-mode-01.txt>, 9 pp.

(Continued)

Primary Examiner — Faruk Hamza
(74) Attorney, Agent, or Firm — David W. Victor; Konrad Raynes and Victor LLP

(57) ABSTRACT

Provided are a method, system, and program for forwarding a message from a transmitting node. A first message is received encoded using a first communication protocol from the transmitting node, wherein the first message includes a direct reference to a memory location in one node. A determination is made as to whether the first message is directed to a receiving node using a second communication protocol. A second message is generated that is compatible with the second communication protocol, wherein the second message causes an operation to be performed with respect to the direct reference in the first message. The second message is transmitted to the receiving node.

16 Claims, 14 Drawing Sheets

U.S. PATENT DOCUMENTS

| | | | |
|---|---|---|---|
| 7,526,574 B2 | 4/2009 | Hufferd et al. | |
| 7,532,640 B2 * | 5/2009 | Kelly et al. | 370/466 |
| 7,577,707 B2 | 8/2009 | Hufferd et al. | |
| 7,877,457 B2 * | 1/2011 | Seidel | 709/213 |
| 2002/0029281 A1 | 3/2002 | Zeidner et al. | |
| 2002/0059309 A1 | 5/2002 | Loy et al. | |
| 2002/0059451 A1 | 5/2002 | Haviv | |
| 2002/0095547 A1 | 7/2002 | Watanabe et al. | |
| 2002/0124137 A1 | 9/2002 | Ulrich et al. | |
| 2003/0014544 A1 | 1/2003 | Pettey | |
| 2003/0041211 A1 | 2/2003 | Merkey et al. | |
| 2003/0046396 A1 | 3/2003 | Richter et al. | |
| 2003/0058870 A1 | 3/2003 | Mizrachi et al. | |
| 2003/0061402 A1 | 3/2003 | Yadav | |
| 2003/0067913 A1 | 4/2003 | Georgiou et al. | |
| 2003/0070043 A1 | 4/2003 | Merkey | |
| 2003/0084209 A1 | 5/2003 | Chadalapaka | |
| 2003/0084243 A1 | 5/2003 | Hoshina et al. | |
| 2003/0101239 A1 | 5/2003 | Ishizaki | |
| 2003/0131228 A1 | 7/2003 | Twomey | |
| 2003/0135514 A1 | 7/2003 | Patel et al. | |
| 2003/0135692 A1 | 7/2003 | Noya et al. | |
| 2003/0165160 A1 | 9/2003 | Minami et al. | |
| 2003/0169690 A1 | 9/2003 | Mott | |
| 2003/0172169 A1 | 9/2003 | Cheng | |
| 2004/0034725 A1 | 2/2004 | Elzur | |
| 2004/0073622 A1 | 4/2004 | McDaniel et al. | |
| 2004/0093411 A1 | 5/2004 | Elzur et al. | |
| 2004/0190533 A1 | 9/2004 | Modi et al. | |
| 2004/0225719 A1 | 11/2004 | Kisley et al. | |
| 2005/0004975 A1 * | 1/2005 | Prasad | 709/203 |
| 2006/0013253 A1 | 1/2006 | Hufferd | |
| 2006/0067346 A1 | 3/2006 | Tucker et al. | |
| 2007/0220160 A1 * | 9/2007 | Seidel | 709/230 |
| 2007/0286157 A1 * | 12/2007 | Shaikh et al. | 370/351 |
| 2008/0175201 A1 * | 7/2008 | Ahmavaara et al. | 370/331 |

OTHER PUBLICATIONS

Ko, M., J. Hufferd, M. Chadalapaka, U. Elzur, H. Shah, and P. Thaler, "iSCSI Extensions for RDMA Specification (Version 1.0)", Release Specification of the RDMA Consortium, Jul. 2003, 76 pp.

Pinkerton, J., "Sockets Direct Protocol v1.0", RDMA Consortium, Oct. 24, 2003, 32 pp.

Pinkerton, J., E. Deleganes, and M. Krause, "Sockets Direct Protocol (SDP) for iWARP over TCP (v1.0)", Release Specification of the RDMA Consortium, Oct. 31, 2003, 106 pp.

Recio, R. "RDMA enabled NIC (RNIC) Verbs Overview", Apr. 29, 2003, 28 pp.

Shah, H., J. Pinkerton, R. Recio, and P. Culley, "Direct Data Placement Over Reliable Transports (Version 1.0)", Release Specification of the RDMA Consortium, Oct. 2002, 35 pp.

Stewart, R., Q. Xie, K. Morneault, C. Sharp, H. Schwarzbauer, T. Taylor, I. Rytina, M. Kalla, L. Zhang, and V. Paxson, "Stream Control Transmission Protocol", RFC 2960, [online], Oct. 2000, [Retrieved on Jun. 3, 2004], retrieved from the Internet at <http://www.ietf.org/rfc/rfc2960.txt>, 114 pp.

Office Action 1 for U.S. Appl. No. 10/893,708, dated Apr. 2, 2009, 15 pp.

Final Office Action for U.S. Appl. No. 10/893,708, dated Sep. 15, 2009, 12 pp.

Notice of Allowance for U.S. Appl. No. 10/893,708, dated Jun. 22, 2010, 8 pp.

Response to Office Action for U.S. Appl. No. 10/893,708, dated Jul. 6, 2009, 17 pp.

Response to Final Office action for U.S. Appl. No. 10/893,708, dated Nov. 19, 2009, 16 pp.

* cited by examiner

ITT/STag Mapping

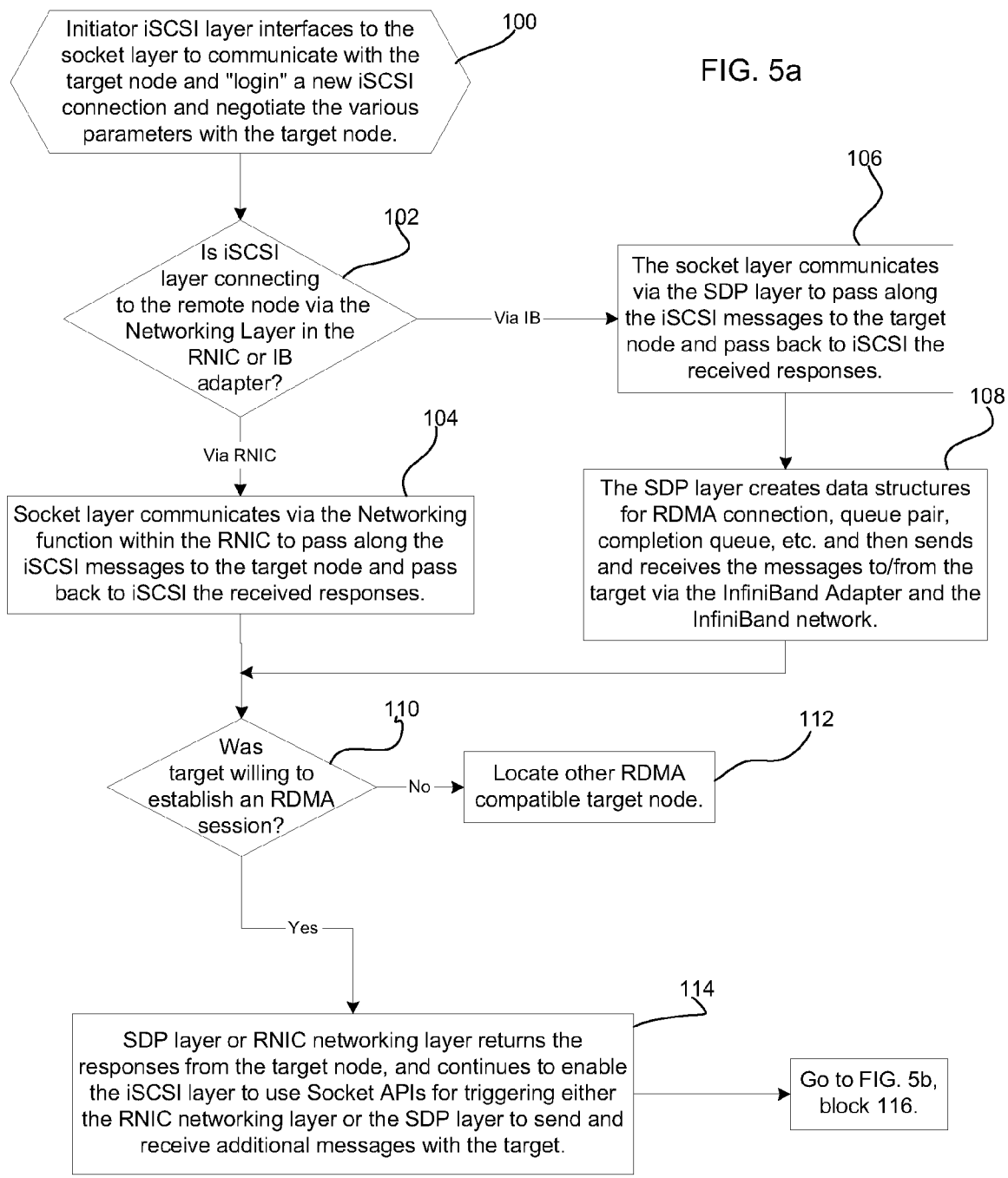

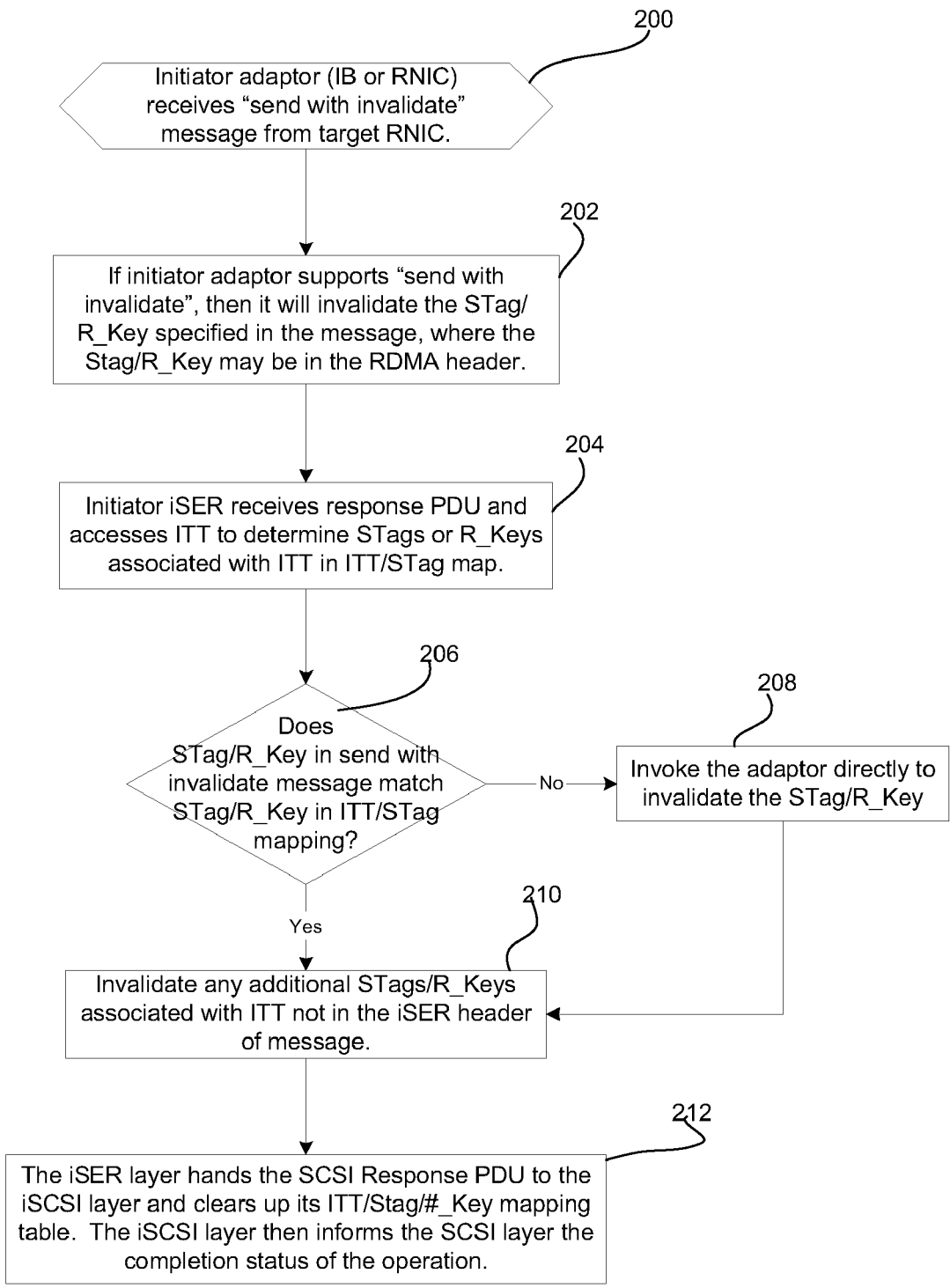

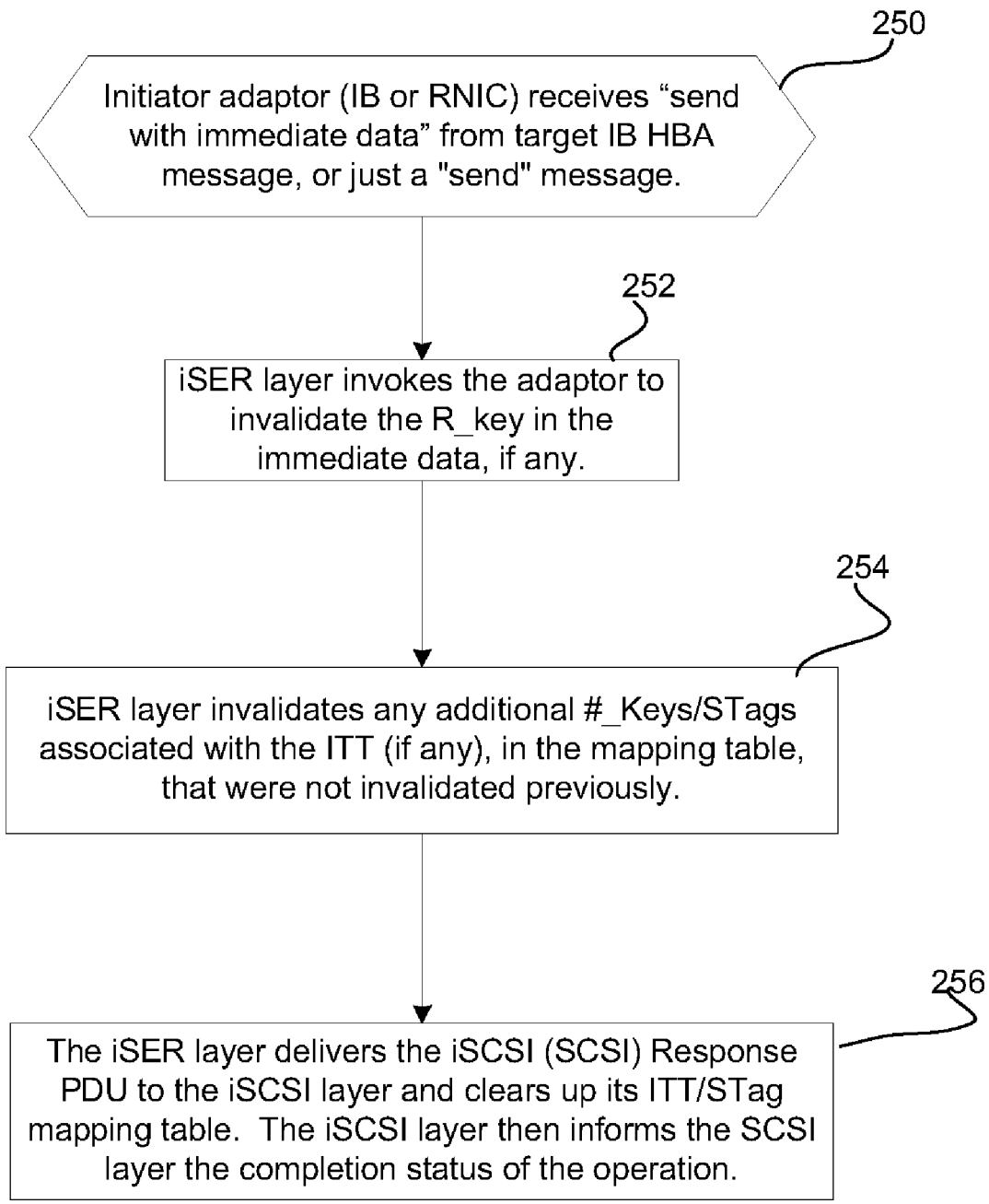

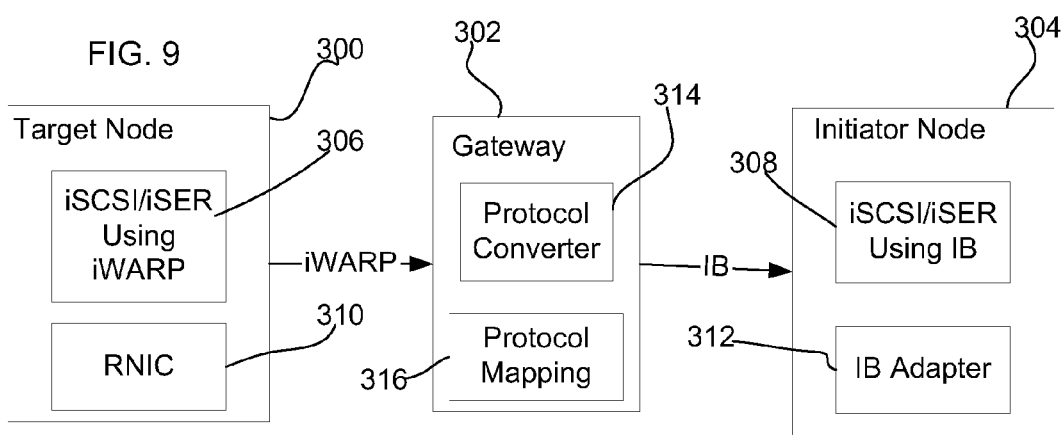
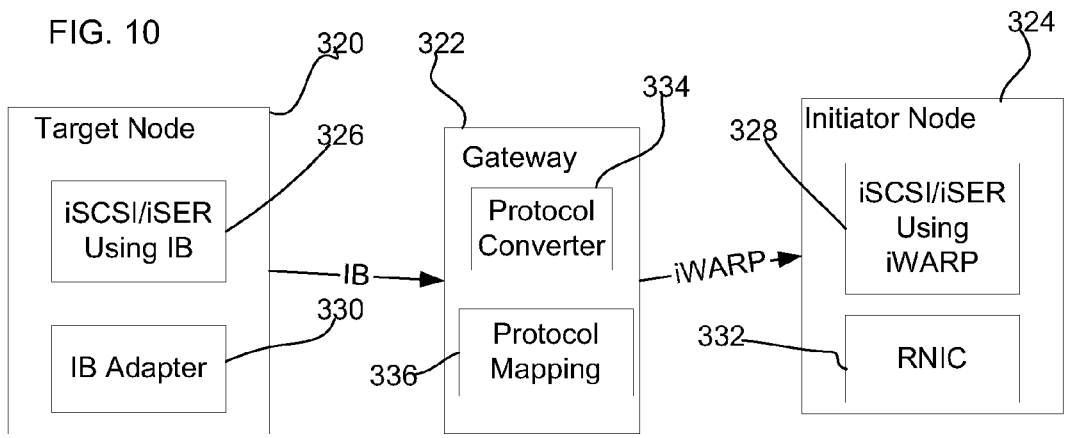

METHOD, SYSTEM, AND PROGRAM FOR FORWARDING MESSAGES BETWEEN NODES

This application is a continuation application of U.S. patent application Ser. No. 10/893,708, filed on Jul. 16, 2004, which patent application is incorporated herein by reference in its entirety.

BACKGROUND OF THE INVENTION

1. Field of the Invention

The present invention relates to a method, system, and program for forwarding messages between nodes.

2. Description of the Related Art

In storage environments, data access commands are communicated from a host system to a storage controller, which manages access to the disks. The storage controller may be a card inside the host system or a separate device. The Internet Small Computer Systems Interface (iSCSI) protocol is used for storage networks that utilize Ethernet connections, including Ethernet switches and routers. The term "iSCSI" as used herein refers to the syntax and semantic of the iSCSI protocol defined by the IETF (Internet Engineering Task Force) standards body, and any variant of that protocol. In current storage networks where iSCSI is utilized, the packet configuration comprises an Ethernet package encapsulating an Internet Protocol (IP) and Transmission Control Protocol (TCP) package layers, which further encapsulate an iSCSI package that includes one or more SCSI commands. The Ethernet protocol provides for link-level error checking as the packets flow from point-to-point on any network segment (link) to determine whether data has been corrupted while passing on a link. In network data transmission operations, an initiator device transmits data or commands over the network to a target device. The TCP/IP package includes an error detection code to perform an end-to-end checking to determine at the opposite end whether the transmitted packet has changed during the transmission as the packet passes through switches and routers. A receiving device detecting an error will send a negative acknowledgment to the sending device to request retransmission of those packets in which errors were detected.

The Remote Direct Memory Access (RDMA) protocol enables one network node to directly place information in another network node's memory with minimal demands on memory bus bandwidth and processor overhead. RDMA over TCP/IP (also known as iWARP) defines the interoperable protocols to support RDMA operations over standard TCP/IP networks. An RDMA Network Interface Card (RNIC) implements the RDMA protocol and performs RDMA operations to transfer data to local and remote memories. Further details of the RDMA protocol are described in the specifications entitled "RDMA Protocol Verbs Specification (Version 1.0)", published by the RDMA Consortium (April, 2003); "Direct Data Placement over Reliable Transports (Version 1.0)", published by RDMA Consortium (October 2002); and "Marker PDU Aligned Framing for TCP Specification (Version 1.0)", published by the RDMA Consortium (October 2002), and which specifications are incorporated herein by reference in their entirety.

One specification entitled "iSCSI Extensions for RDMA Specification (Version 1.0), by Michael Ko et al., released by the RDMA Consortium (July, 2003), which specification is incorporated herein in its entirety, defines a protocol for providing the RDMA data transfer capabilities to iSCSI by layering iSCSI on top of RDMA.

Many of the features defined as part of RDMA over TCP/IP, also known as iWARP, were previously defined as operations in an InfiniBand network. The InfiniBand adaptor hardware supports RDMA operations. InfiniBand also defines a set of protocols called Socket Direct Protocols (SDP) that allow a normal TCP/IP socket application to send a message across an InfiniBand network, in the same manner they would if they were operating on a TCP/IP network. Further details of the InfiniBand and SDP protocols are described in the publication "InfiniBand™ Architecture, Specification Volume 1", Release 1.1 (November, 2002, Copyright InfiniBand™ Trade Association), which publication is incorporated herein in its entirety.

BRIEF DESCRIPTION OF THE DRAWINGS

Referring now to the drawings in which like reference numbers represent corresponding parts throughout:

FIGS. 5a, 5b, 6a, 6b, 7 and 8 illustrate operations performed to transfer data in accordance with embodiments;

FIGS. 9, 10, 11a, and 11b illustrate embodiments including a gateway; and

SUMMARY

Provided are a method, system, and program for forwarding a message from a transmitting node. A first message is received encoded using a first communication protocol from the transmitting node, wherein the first message includes a direct reference to a memory location in one node. A determination is made as to whether the first message is directed to a receiving node using a second communication protocol. A second message is generated that is compatible with the second communication protocol, wherein the second message causes an operation to be performed with respect to the direct reference in the first message. The second message is transmitted to the receiving node.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
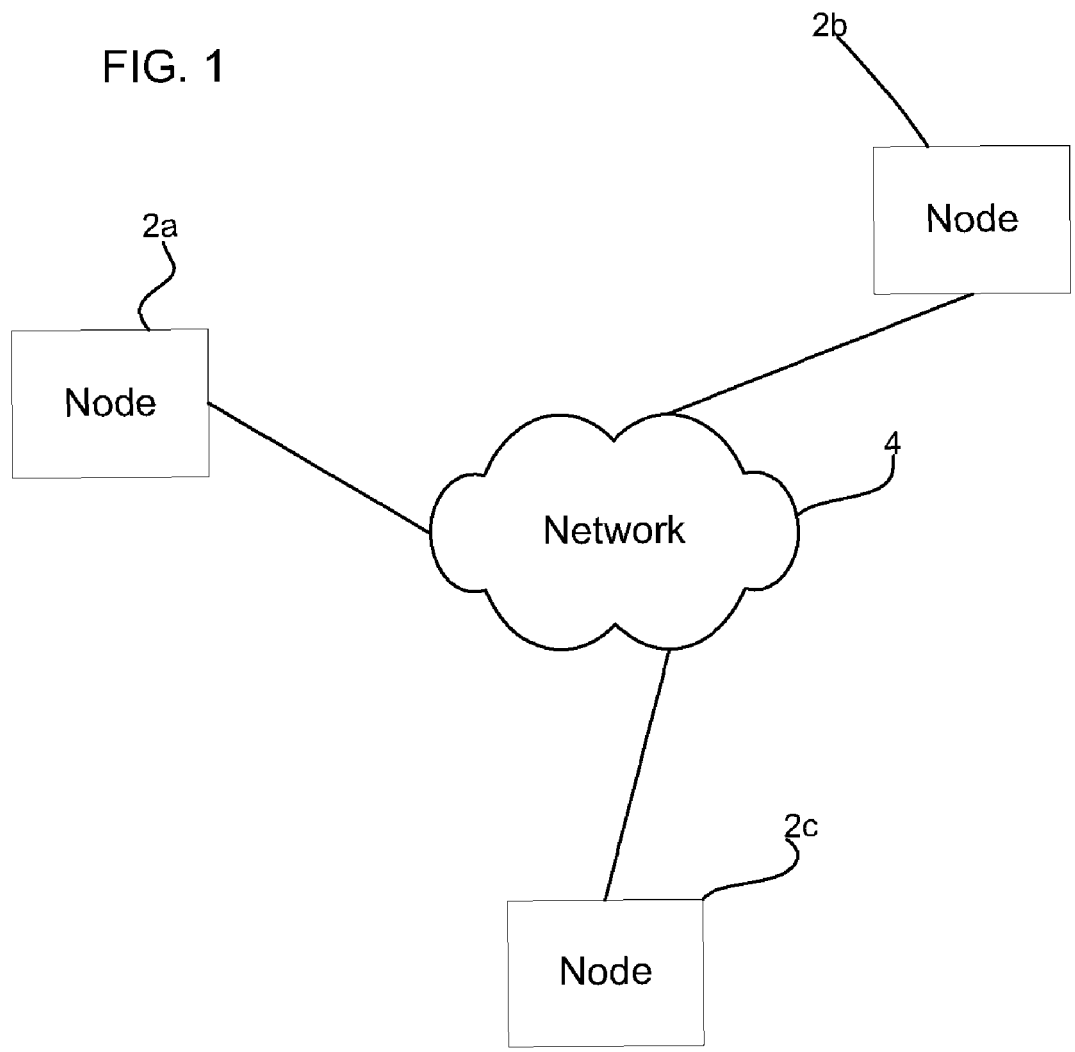
FIG. 1 illustrates an example of network nodes in which embodiments are implemented.

FIG. 1 illustrates a network computing environment comprised of a plurality of computing nodes 2a, 2b . . . 2n that communicate over a network 4. The network may comprise a Local Area Network (LAN), Wide Area Network (WAN), Storage Area Network (SAN). Alternatively, the nodes may communicate over a bus, such a SCSI bus, etc.

Figure 2:
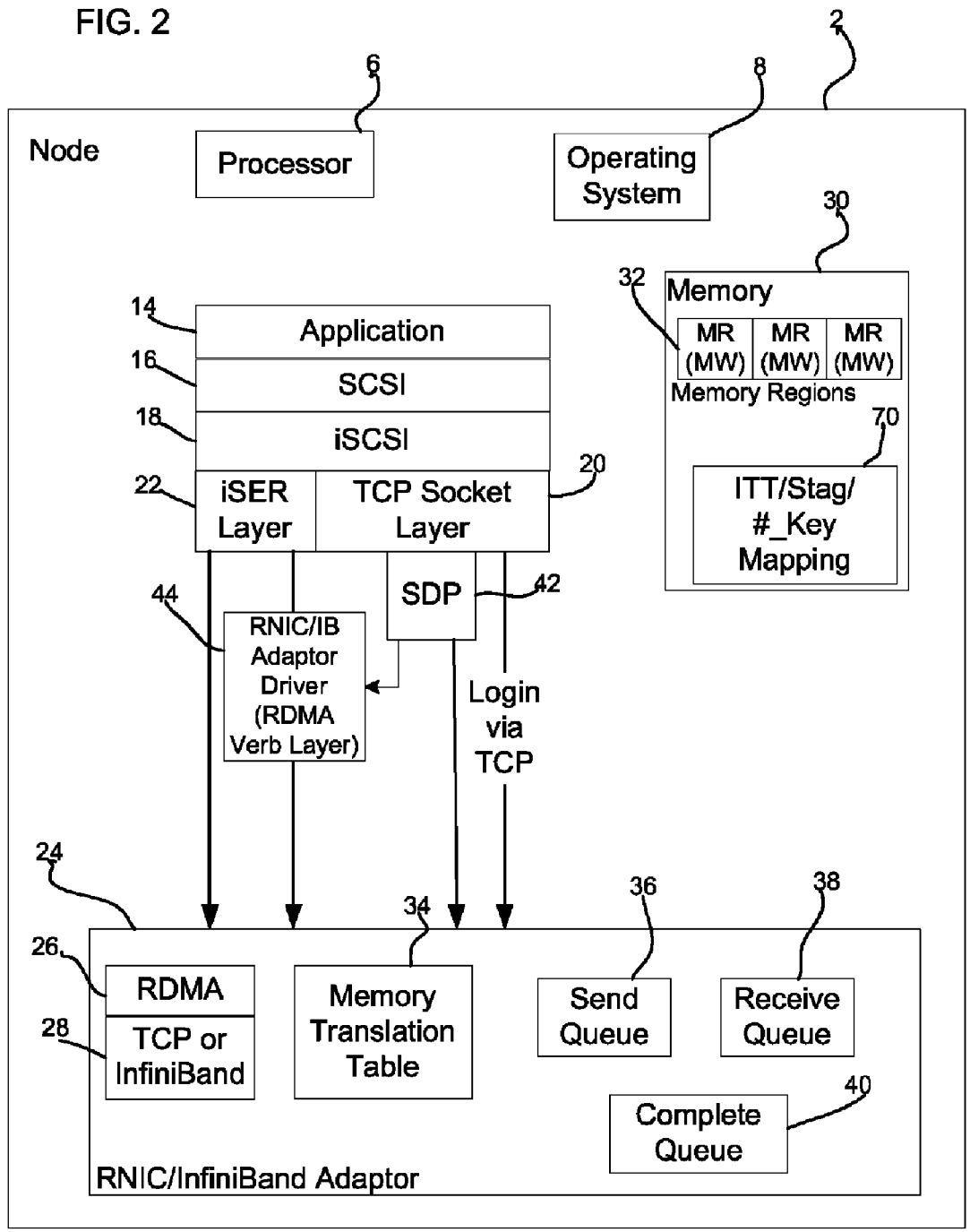
FIG. 2 illustrates an example of a computing architecture in accordance with the described embodiments.

The nodes 2a, 2b . . . 2n in FIG. 1 may operate as both initiators and targets. FIG. 2 illustrates components included in a node, such as nodes 2a, 2b, 2c, to enable communication over the network 4. A node 2 includes a processor 6, such as a central processing unit or complex, and an operating system 8. The node 2 further includes an application 14 comprising a user application, such as a database program, server program, etc. To perform an I/O operation, the application 14 would make a call to a SCSI layer 16 to generate a SCSI I/O request, which in turn would make a call to an iSCSI layer 18. The iSCSI layer 18 initiates communication with a target node by performing an iSCSI login operation. To login, the iSCSI layer interfaces with a socket layer 20, such as a TCP socket layer, to establish communication with the remote target node and login. A socket layer 20 comprises a programming interface used to interface between the iSCSI layer 18 and a network protocol in an adaptor 24.

The adaptor 24 may comprise an RNIC adaptor or InfiniBand (IB) adaptor. The adaptor 24 includes an RDMA layer 26 and a network layer 28, such as a TCP layer or InfiniBand layer, to package a packet in the transport layer for transmission over the network 4 or unpackage packets received from the network 4.

In cases where the adaptor 24 comprises an InfiniBand adaptor, the node 2 may include a Sockets Direct Protocol (SDP) layer 42, such that the socket layer 20 interfaces with the SDP layer 42 and the SDP layer 42 interfaces between the sockets layer 20 and the RDMA layer 26. In InfiniBand embodiments, the SDP layer 42 provides an interface between an application 14 making calls using the socket layer 20 and the RDMA layer 26 in the adaptor 24, by implementing the socket layer 20 calls from the iSCSI layer 18 through RDMA calls to the RDMA layer 26 (either directly or via the IB adapter driver 44). In both InfiniBand and RNIC embodiments, an iSER layer 22 is provided, such that after login, the iSCSI layer 18 would call an iSER layer 22 to make calls to the RNIC 24. The iSER layer 22 may call the RNIC 24 directly through function calls or through the RNIC driver 44 comprising an RDMA verb layer. In embodiments where the adaptor 24 comprises an RNIC adaptor, the node 2 may not include the SDP layer 42, whereas in InfiniBand adaptor embodiments, an SDP layer 42 is included.

The RDMA layer 26 may directly access registered memory locations in the initiator and target nodes (locally or locally and remotely) in a logically contiguous fashion. A defined memory location, such as a memory region or memory window, is identified by a steering tag created by the RDMA layer 26 and used to reference the registered memory location, such as memory regions 32. In RNIC implementations, the steering tag is referred to as an STag and in InfiniBand embodiments, the steering tags are referred to as an R_Key for a Remote steering tag and as an L_Key for a Local steering tag (the generic term that is used here for both is #_Key). In certain embodiments, a memory region or subset of a memory region referred to as a memory window may be registered, where a separate STag/#_key would be associated with each registered memory location, region or window. The RDMA layer 26 uses the STag/#_key to access the referenced memory location. In certain embodiments, the iSER layer 22 would call the adaptor 24 to register the memory regions by calling the RDMA verb layer 44. The RDMA verb layer 44 (RNIC/IB adapter driver) comprises the device driver to interface the operating system 8 with the adaptor 24. In response to the call from the function in the iSER layer 22 or SDP layer 42 to declare and register a memory location, e.g., memory region or window, the adapter driver 44 would call the adaptor 24.

The RDMA layer 26 maintains a memory translation table 34, and when registering a memory region, would add an entry to the memory translation table 34 identifying the registered memory region and the STag/#_key generated to reference that memory region to enable the RDMA layer 26 to associate the STag/#_key with the memory region. The memory translation table 34 may be maintained within buffers in the adapter 24 or within the memory 30. The Stags/#_Keys would be returned to the iSER layer 22 functions requesting the registration to use for I/O operations.

After the adapter 24 generates and returns Stags/#_Keys to the iSER layer 22, the iSER layer 22 may proceed with the I/O operation. The iSER layer 22 wraps the packet received from the iSCSI layer 18 with header information and the STag/R_Key received from the adapter 24 and pass the packet to the adapter 24 to transfer.

To manage RDMA data transfers, the RDMA layer 26 maintains a send queue 36, a receive queue 38, and a complete queue 40. The send queue 36 and receive queue 38 comprise the work queues that the RDMA layer 26 uses to manage RDMA data transfer requests. The complete queue 40 may comprise a sharable queue containing one or more entries having completion entries to provide a single point of completion notification for multiple work queues. The queues 36, 38, and 40 may have many instances, perhaps for each logical connection, and may be allocated by the adaptor 24 in the memory 30 or within buffers in the adaptor 24.

Figure 3:
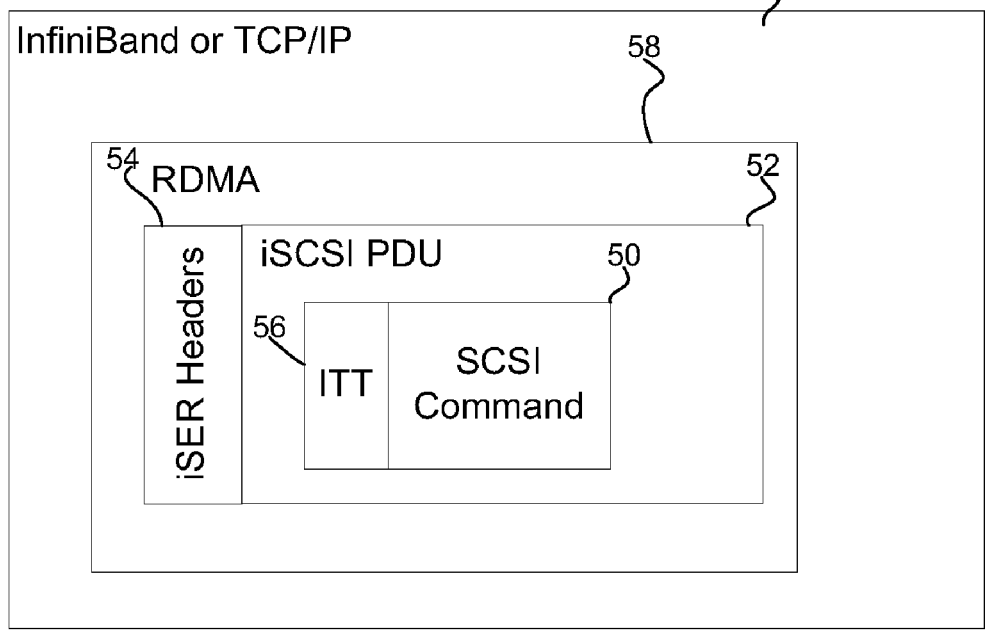
FIG. 3 illustrates a packet format.

FIG. 3 illustrates the format of a transmitted package used with the embodiments. A SCSI command 50 (such as a read or write command), which is generated by the SCSI layer 16, is encapsulated by the iSCSI layer 18 within an iSCSI protocol data unit (PDU) 52, which is further encapsulated by the functions in the iSER layer 22 within an iSER header 54. The iSCSI PDU 52 including a SCSI command 50 further includes an initiator task tag (ITT) 56, which the iSCSI layer 18 assigns to every issued iSCSI task, associated with an underlying SCSI command, to identify the underlying SCSI I/O operation. The ITT 56 uniquely identifies the task session wide. When the target node responds to a request from the initiator, the ITT 56 is used to relate the response to the original request at the iSCSI layer 18. For instance, an ITT 56 in the iSCSI's SCSI Response PDU from the target iSCSI layer 18, that is sent when the target has completed the operation and returns operational status, is used by the initiator iSCSI layer 18 to relate the target's PDU with the original SCSI write command.

The iSER header 54 would include the Stag/R_Key used with the I/O operation and information indicating whether the remote node receiving the advertised Stag/R_Key is to read or write to the memory region (window) referenced by the Stag/R_Key and the work queues related to the request. The iSER header 54 and iSCSI PDU 52 are further encapsulated in one or more additional network layers 60, such as a TCP layer or InfiniBand network protocol layer. In certain embodiments, the network layers 28 in the adapter 24 would assemble the iSER header 54 and PDU 52 within the network layers 60, such as TCP, IB, etc. etc.

Figure 4:
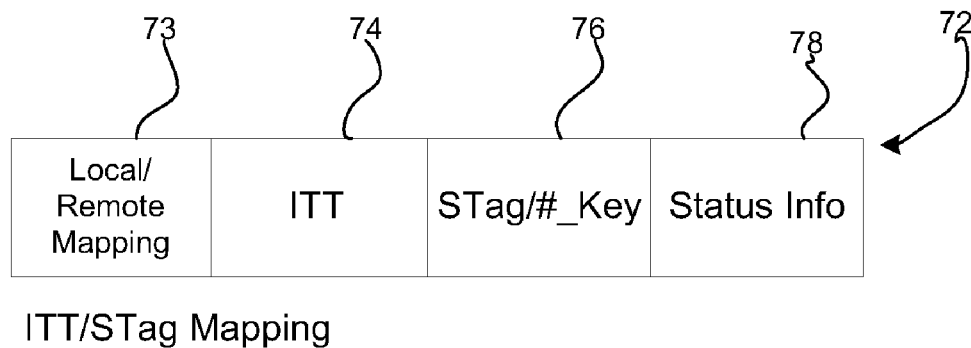
FIG. 4 illustrates information maintained on a mapping.

The iSER layer 22 further maintains an ITT to Stag/#_Key map 70 (FIG. 2) in the memory 30 that associates an ITT representing an iSCSI task with an STag/#_key used to transfer the data for that task, such as a read or write Stag/R_Key to cause the target node to read or write data through the RDMA channel. FIG. 4 illustrates the content of an entry 72 in the map 70, including a local/remote indicator 73 indicating whether the mapping is for a local STag/L_Key or a remote Stag/R_Key. A local mapping entry associates an Stag/L_Key referencing a local memory window or region with an ITT that is used to store (or retrieve) data locally related to the I/O command and a remote mapping entry associates an STag/R_key referencing a memory region or window on a remote node with an ITT from which data is to be read or transferred to the local memory region or window. The mapping entry 72 further includes the associated ITT 74 representing the iSCSI task, an Stag/#_Key 76 associated with that task, and status information 78 on the task.

Figure 5B:
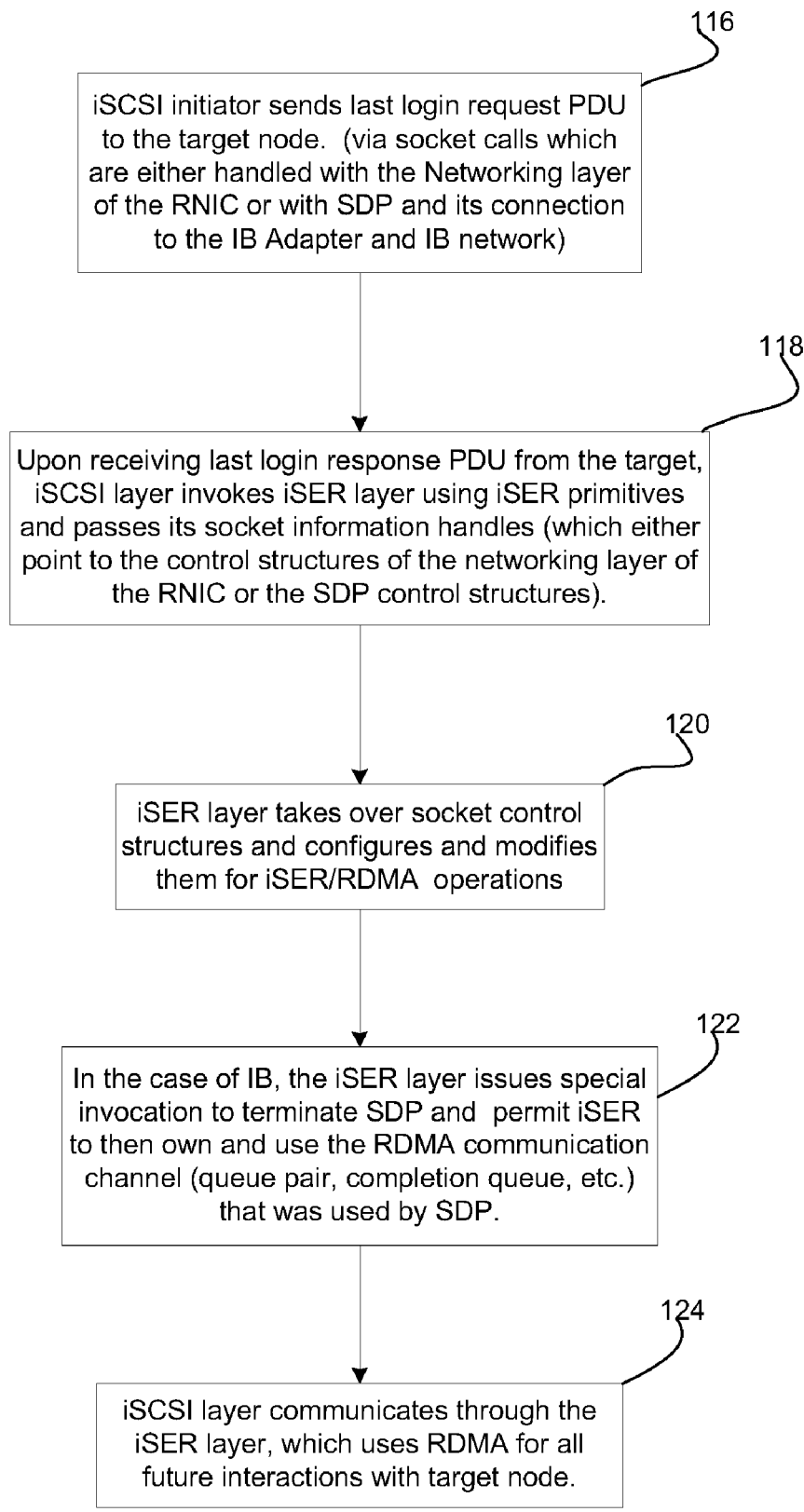

FIGS. 5*a*, 5*b*, 6*a*, 6*b*, 7, and 8 illustrate operations to process a SCSI write command in accordance with described embodiments. FIGS. 5*a* and 5*b* illustrate operations implemented by components in the initiator node 2 to connect with a target node for using RDMA for an initiator node 2 including either a RNIC or InfiniBand adaptor 24. With respect to FIG. 5*a*, control begins at block 100 where the iSCSI layer 18 interfaces to the socket layer 20 to communicate with the target node and "login" a new iSCSI connection and negotiate the various parameters with a target node. Both the initiator and target node may include the architecture shown in FIG. 2 and include matching RNIC and/or InfiniBand adaptors. The operations performed in the initiator node then depend on whether the initiator node 2 includes an RNIC or InfiniBand adaptor 24. As discussed, the initiator node 2 may load the layers and code needed to communicate based on the type of adaptor 24 installed in the initiator node 24. For instance, if the node includes an InfiniBand adaptor, then the node would load the SDP layer 42, whereas if the node includes only an RNIC adaptor, then the SDP layer 42 may not be loaded. If (at block 102) the iSCSI layer 18 connects via an RNIC adaptor 24, then the socket layer 20 communicates (at block 104) via the TCP 28 networking function within the RNIC adaptor 24 to pass along the iSCSI messages to the target node and pass back to the iSCSI layer 18 the received responses via the socket layer 20. Otherwise, if (at block 102) the iSCSI layer 18 connects via an InfiniBand adaptor 24, the socket layer 20 communicates (at block 106) via the SDP layer 42 to pass along the iSCSI messages to the target node and pass back to iSCSI layer 18 the received responses via the socket layer 20. The SDP layer 42 creates (at block 108) data structures for an RDMA connection, such as a queue pair 26, 28, completion queue 40, etc., and then sends and receives the messages to/from the target via the InfiniBand adapter 24 and the Infini-Band network 4.

If (at block 110) the initiator node 2 is not willing to establish an RDMA session with the remote node via the Networking Layer in the RNIC or InfiniBand adaptor 24, then the initiator node 2 would break the negotiation connection and attempt (at block 112) to locate other RDMA compatible target nodes. Otherwise, if (at block 110) an RDMA session is acceptable, then (at block 114) the SDP layer 42 (for InfiniBand adaptors 24) or the network layers 28 (for RNIC adaptors) (at block 114) returns the response from the target node, and continues to enable the iSCSI layer to use Socket APIs for triggering either the RNIC networking layer 28 or the SDP layer 42 to send and receive additional Login Request and Login Response messages with the target.

With respect to FIG. 5*b*, after the login parameters are established, the initiator iSCSI layer 18 sends (at block 116) a last login request PDU to the target node via socket calls which are either handled with the networking layer (e.g., TCP) for an RNIC adaptor 24 or with the SDP layer 42 for an InfiniBand adaptor. Upon receiving (at block 118) a last login response PDU from the target, the iSCSI layer 18 invokes the iSER layer 22 using iSER primitives and passes its socket information handles (which either point to the control structures of the networking layer 28 for an RNIC adaptor 24 or SDP RDMA control structures for an InfiniBand adaptor). The iSER layer 22 then takes over (at block 120) socket control structures and configures and modifies them for iSER/RDMA operations. In the case of an InfiniBand adaptor 24, the iSER layer 22 issues (at block 122) a special invocation to terminate the SDP session and permit the iSER layer 22 to then own and use the RDMA communication channel (queue pair, completion queue, etc.) that was used by SDP. The iSCSI layer then communicates (at block 124) with the iSER layer via RDMA for all future communications within the target node.

Figure 6A:
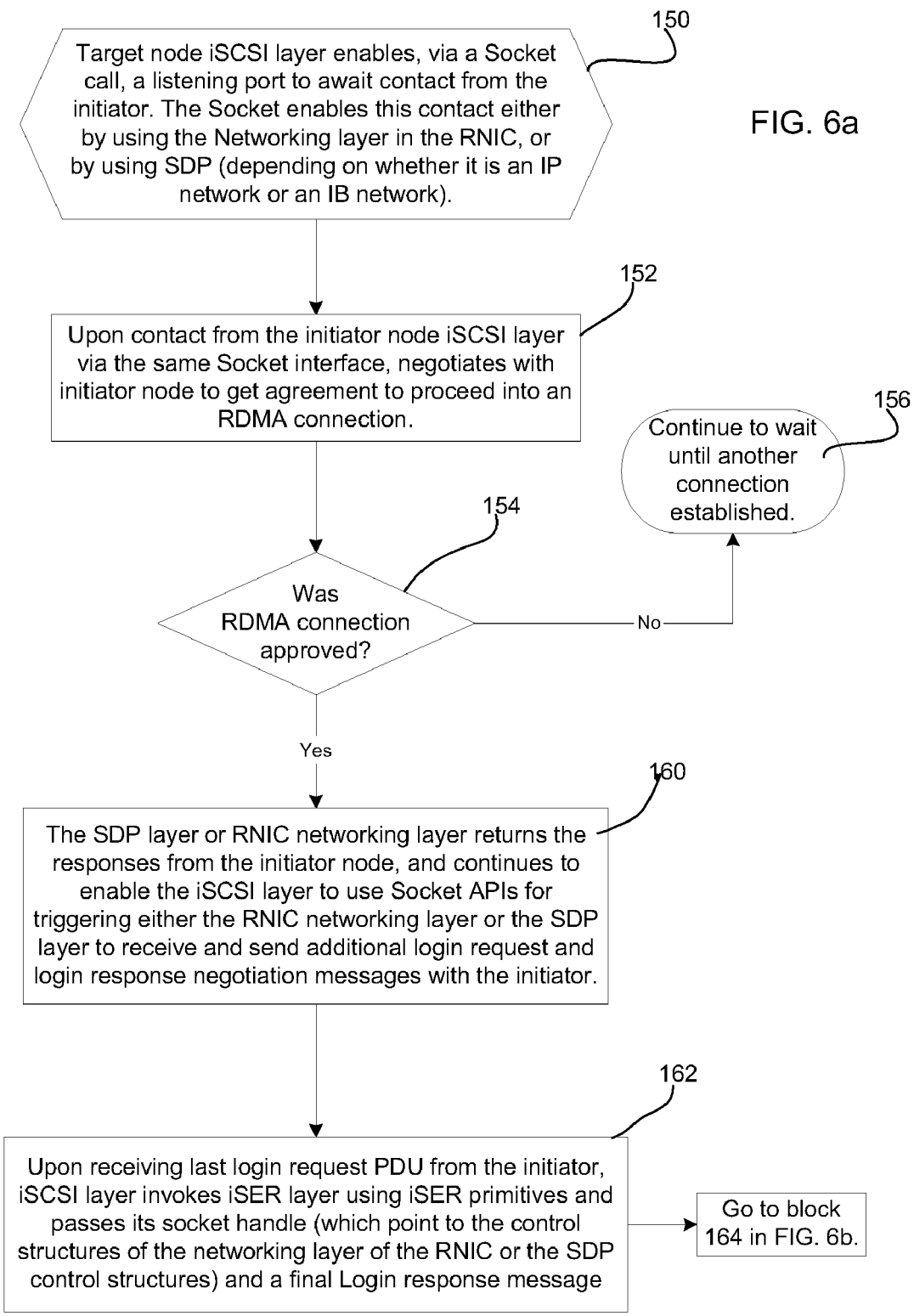
Figure 6B:
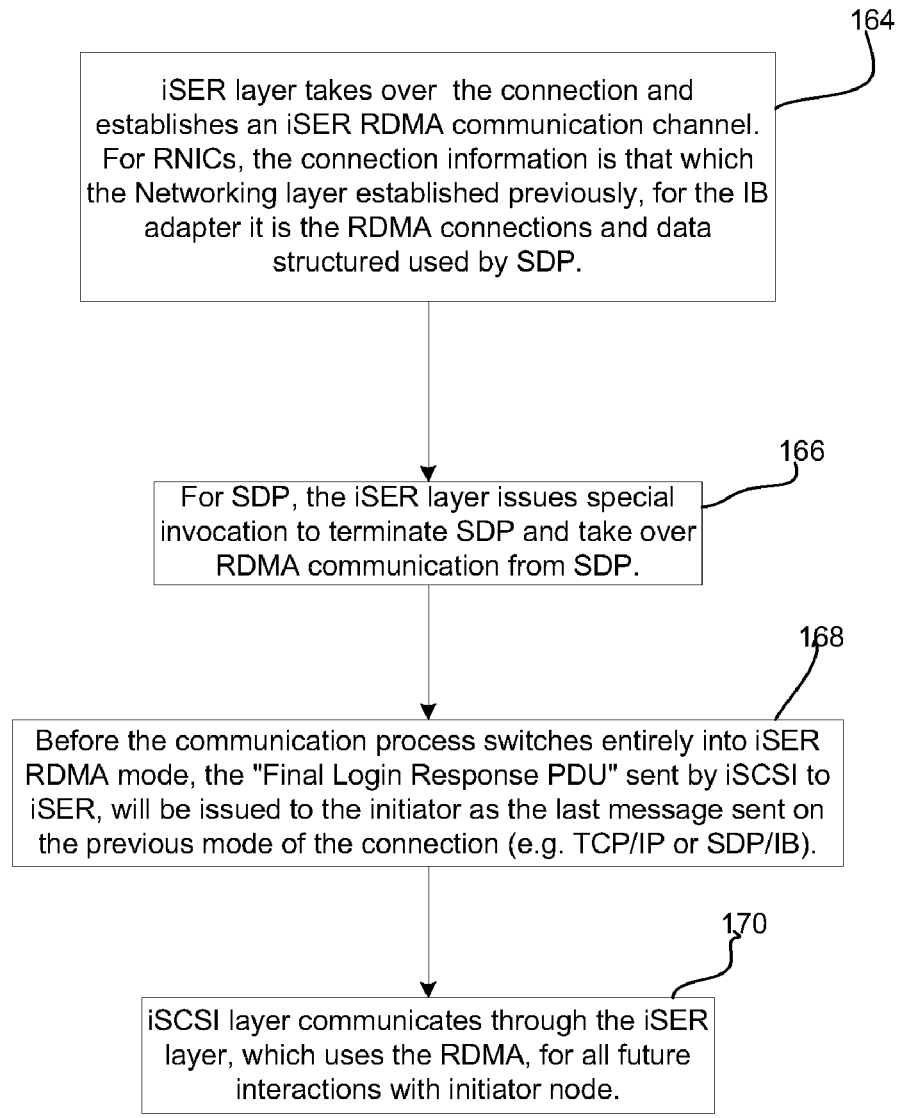

FIGS. 6*a* and 6*b* illustrate operations implemented by components in the target node, which may have the architecture of node 2 (FIG. 2) to connect with the initiator node for using RDMA, where the target node 2 includes either an RNIC or InfiniBand adaptor 24. The architecture described with respect to FIG. 2 is used to describe the components within both initiator and target nodes. With respect to FIG. 6*a*, the target node iSCSI layer 20 enables (at block 150), via a Socket call, a listening port to await contact from the initiator node. The socket layer 20 enables this contact either by using the networking layer 28 (e.g., TCP) in an RNIC adaptor 24 or by using SDP 42 for an InfiniBand adaptor communicating over an InfiniBand network. Upon contact (at block 152) from the initiator node iSCSI layer 18 via the same socket interface, the target node negotiates with the initiator node to obtain agreement to proceed into an RDMA connection. If (at block 154) the RDMA connection is not approved, then the target node breaks the negotiation connection and continues to wait (at block 156) until another connection is established. Otherwise, if the RDMA connection is approved, then the RNIC networking layer 28 at the target node, e.g., TCP, or the SDP layer 42 returns (at block 160) to the iSCSI layer 18 via the socket API responses from the initiator node and continues to enable the iSCSI layer to use socket APIs for triggering either the RNIC Networking layer or the SDP layer to receive and send additional Login Request and Login Response messages with the initiator. The target iSCSI layer 18 (at block 162), upon receiving the last Login Request from the initiator invokes iSER layer 22 using iSER primitives and passes its socket information handle (which either points to the control structures of the networking layer 28 of the RNIC adapter or the SDP control structures) and a final Login Response message.

With respect to FIG. 6*b*, after iSCSI invokes the iSER layer 22, the iSER layer 22 (at block 164) takes over the connection and establishes an iSER RDMA communication channel. For RNIC adaptors 24, the connection information is that which the networking layer 28, e.g., TCP, established previously, for the InfiniBand adapter 24 the connection information includes the RDMA connections and data structured created and used by the SDP layer 42. In either case the RDMA RNIC or InfiniBand Adapter data/control structures are modified to permit the iSER/RDMA operations. For an InfiniBand adaptor 24, the iSER layer 22 issues (at block 166) a special invocation to terminate the SDP session and take over RDMA communication from the SDP layer 42. Before the communication process switches entirely into iSER RDMA mode (at block 168), the "Final" Login Response PDU, sent by target iSCSI to iSER, will be issued to the initiator as the last message sent on the previous mode of the connection (e.g. TCP/IP, or SDP/IB). The iSCSI layer then communicates (at block 170) through the iSER layer, which uses RDMA for all future interactions with initiator node.

FIG. 7 illustrates operations performed by the initiator node 2 upon a SCSI command completion and the receiving of a "send with invalidate" message from a target node having an RDMA adaptor that is capable of sending a "send with invalidate message". Upon receiving (at block 200) the "send with invalidate" message, if the adaptor 24 supports "send with invalidate", then the adaptor 24 invalidates (at block 202) the STag/R_key specified in the message, where the STag may be in the RDMA header. If the initiator does not support "send with invalidate", which may occur with an InfiniBand adaptor 24, then the message is forwarded to the iSER layer 22 to process. The initiator iSER layer 22 receives (at block 204) the response PDU and accesses the ITT 56 (FIG. 3) from the message to determine the STags or R_Keys associated with the accessed ITT in the ITT/STag map 70. If (at block 206) the STag/R_key in a "send with invalidate" message matches an STag/R_key in the ITT/STag mapping 70 and the initiator's adapter supports the automatic invalidate, then the initiator iSER layer 22 invalidates (at block 208) any additional STags/#_Keys associated with the ITT in the mapping 70 that were not invalidated by the adapter. If the adapter does not support the automatic invalidation or if the and STag/R_key in the "send with invalidate" does not match one STag/R_key in the mapping 70, then the iSER layer 22 invokes (at block 210) the adaptor directly to invalidate the STag/R_key and any additional STags/#_Keys associated with the ITT in the mapping 70. The iSER layer 22 then hands (at block 212) the SCSI Response PDU to the iSCSI layer 18 and clears up its ITT/Stag/#_Key mapping table 70. The iSCSI layer 18 then informs the SCSI layer 16 of the completion status of the operation.

FIG. 8 illustrates operations performed by the initiator node 2 upon a SCSI command completion and the receiving of a "send with immediate data" message from a target node having an InfiniBand adaptor 24. Upon the initiator adaptor 24 (InfiniBand or RNIC) receiving (at block 250) the "send with immediate data" message from the target InfiniBand adaptor or a "send" message, the message is passed to the iSER layer 22 by the initiator adaptor 24 (at block 252) and the iSER layer calls the adapter 24 to invalidate the R_key in the "immediate data" portion of the message, if any. The iSER layer 22 would then cause the adapter 24 to invalidate (at block 254) any #_Keys/STags associated with the ITT in the mapping 70 that were not invalidated previously. The iSER layer 22 delivers (at block 256) the SCSI Response PDU to the iSCSI layer 18 and clears up its ITT/Stag/#_Key mapping table 70. The iSCSI layer 18 then informs the SCSI layer 16 the completion status of the operation.

Protocol Gateway

FIGS. 9, 10, 11a, and 11b illustrate how a gateway 302, 322, 352, and 354 may be used to transfer messages between nodes. Each gateway 302, 322, 352, and 354 may comprise a retransmitting hardware device through which the target and initiator communicate messages, such as a switch, router, etc. The gateway 302, 322, 352, and 354 includes a protocol converter 314, 334, 362, and 364 to process messages sent between the initiator and target node that are being sent from one protocol to another. Alternatively, the gateway 302 may be implemented in the target node or initiator node hardware. The gateways 302, 322, 352, and 354 further include a protocol mapping 316, 336, 353, and 365 that provides a mapping between messages in a one protocol, such as InfiniBand, to another protocol, such as iWARP.

FIG. 9 illustrates a target node 300 that implements iSCSI/iSER using iWARP 306 and includes an RNIC 310 to transmit messages using the iWARP protocol. The gateway 302 receives a message from the target node 300 on an iWARP network directed to an initiator node 304 implementing the iSCSI/iSER protocol using InfiniBand 308 and having an InfiniBand adaptor 312. The protocol converter 314 transforms the iWARP message to a message conforming to the InfiniBand protocol that is compatible with the InfiniBand adaptor 312.

FIG. 10 illustrates a target node 320 that implements iSCSI/iSER using InfiniBand 326 and includes an InfiniBand adaptor 330 to transmit messages using the InfiniBand protocol. The gateway 322 receives a message from the target node 320 in InfiniBand directed to an initiator node 324 implementing the iSCSI/iSER protocol using iWARP 328 and having an RNIC 332. The protocol converter 334 transforms the InfiniBand message to a message conforming to the iWARP protocol that is compatible with the RNIC adaptor 332 operating using the iWARP protocol.

Figure 11A:
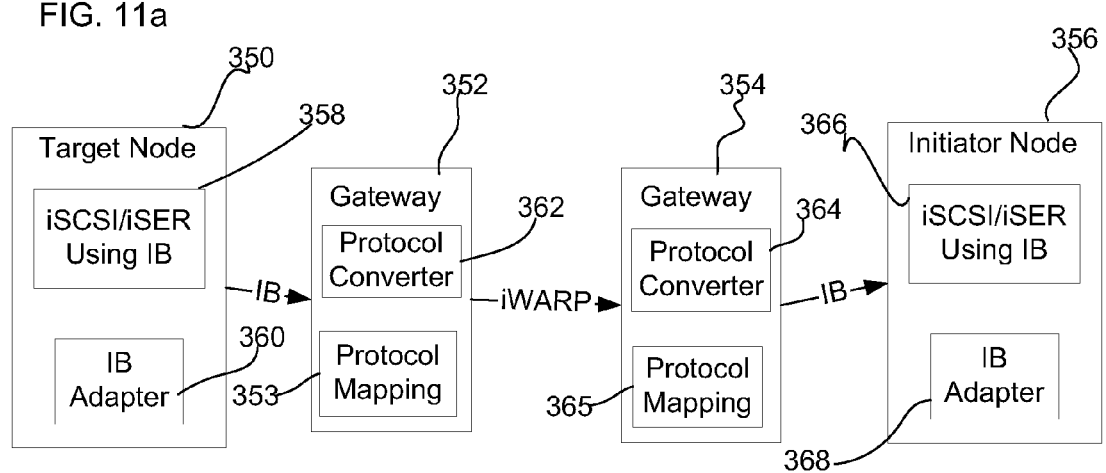

FIG. 11a illustrates an embodiment where gateways 352 and 354 work together to deliver an iSER/IB message from a target node 350 to an initiator node 356 while converting the message for transmission on an intermediate iWARP Network. A target gateway 352 receiving the InfiniBand message from target 350 converts the message to a format compatible with the iWARP protocol and sends the converted message to an initiator gateway 354 on an iWARP network. An initiator gateway 354 receiving the iWARP message from the target gateway 352 converts the message to a format compatible with the InfiniBand protocol used at the initiator node 356 and then sends the converted message to an initiator node 356. In this way, the gateways 352 and 354 are used to convert the message for transmittal through an iWARP network between two nodes 350 and 356 using the InfiniBand protocol, and including iSCSI/iSER using InfiniBand 358, 366 and InfiniBand adaptors 360, 368. Further, in alternative embodiments, there may be any number of gateways between the initiator and target node performing any number of conversions of the message for use with the different possible communication protocols.

Figure 11B:
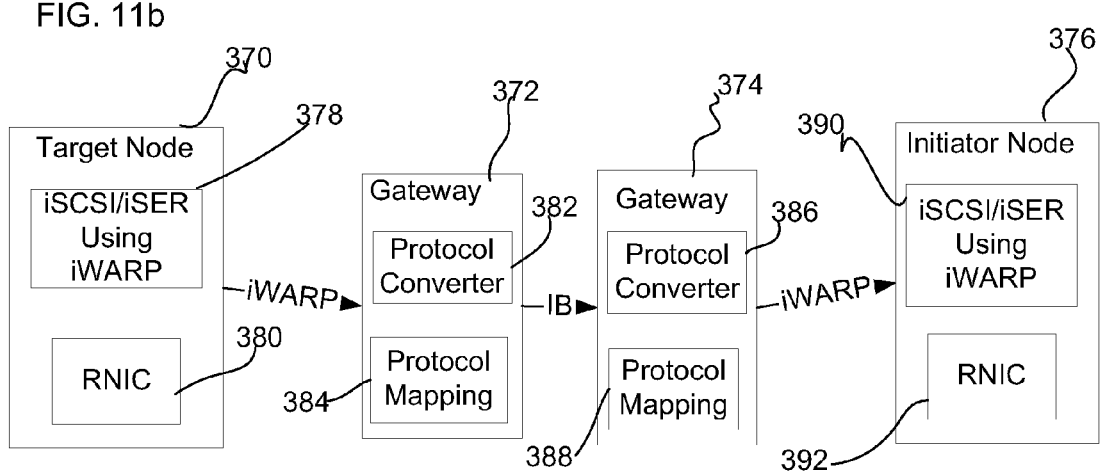

FIG. 11b illustrates an embodiment where two gateways 372 and 374 work together to deliver an iSER/iWARP message from a target node 370 to an initiator node 376 while converting the message for transmission on an intermediate InfiniBand network. A target gateway 372 receiving the iWARP message from the target node 370 converts the message to a format compatible with the InfiniBand protocol and sends the converted message to an initiator gateway 374 on an InfiniBand network. An initiator gateway 374 receiving the InfiniBand message from the target gateway 372 converts the message to a format compatible with the iWARP protocol used at the initiator node 376 and then sends the converted message to the initiator 376 on the iWARP network. In this way, the gateways 372 and 374 are used to convert the message for transmittal through an InfiniBand network between two nodes 370 and 376 using the iWARP protocol, and including iSCSI/iSER using iWARP 378, 390 and iWARP adaptors 380, 392. Further, in alternative embodiments, there may be any number of gateways between the initiator and target node performing any number of conversions of the message for use with the different possible communication protocols.

FIGS. 9, 10, 11a, and 11b show the message flowing from a target node to an initiator node. However, the message flow may proceed from the initiator to the target node, or between any two types of nodes. For instance, the gateways 352 and 354 can be repeated at this point for FIG. 11a, and gateways 372 and 374 in FIG. 11b can be repeated.

Figure 12:
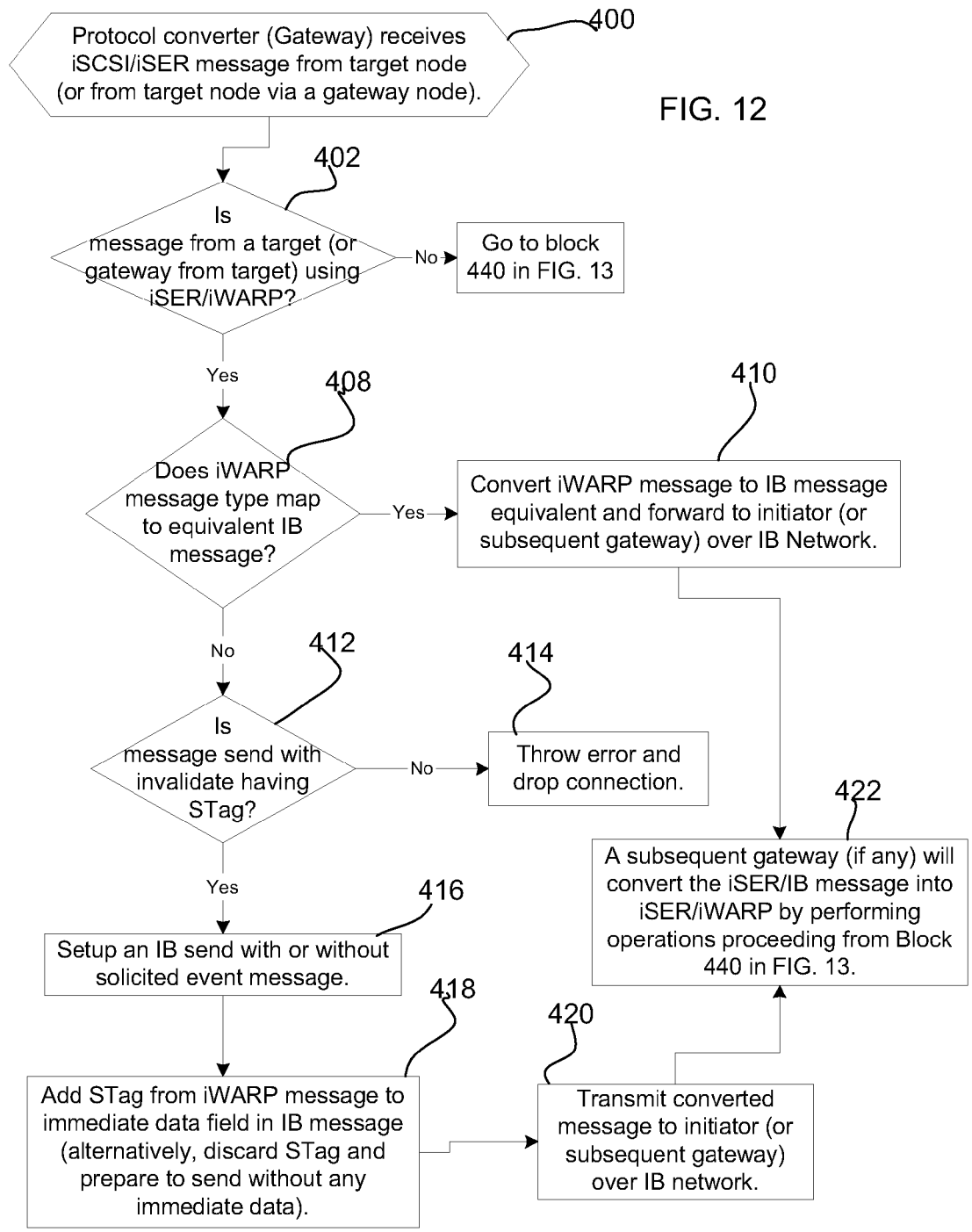
FIGS. 12, 13, and 14 illustrate operations performed in the gateway to process and forward messages.
Figure 13:
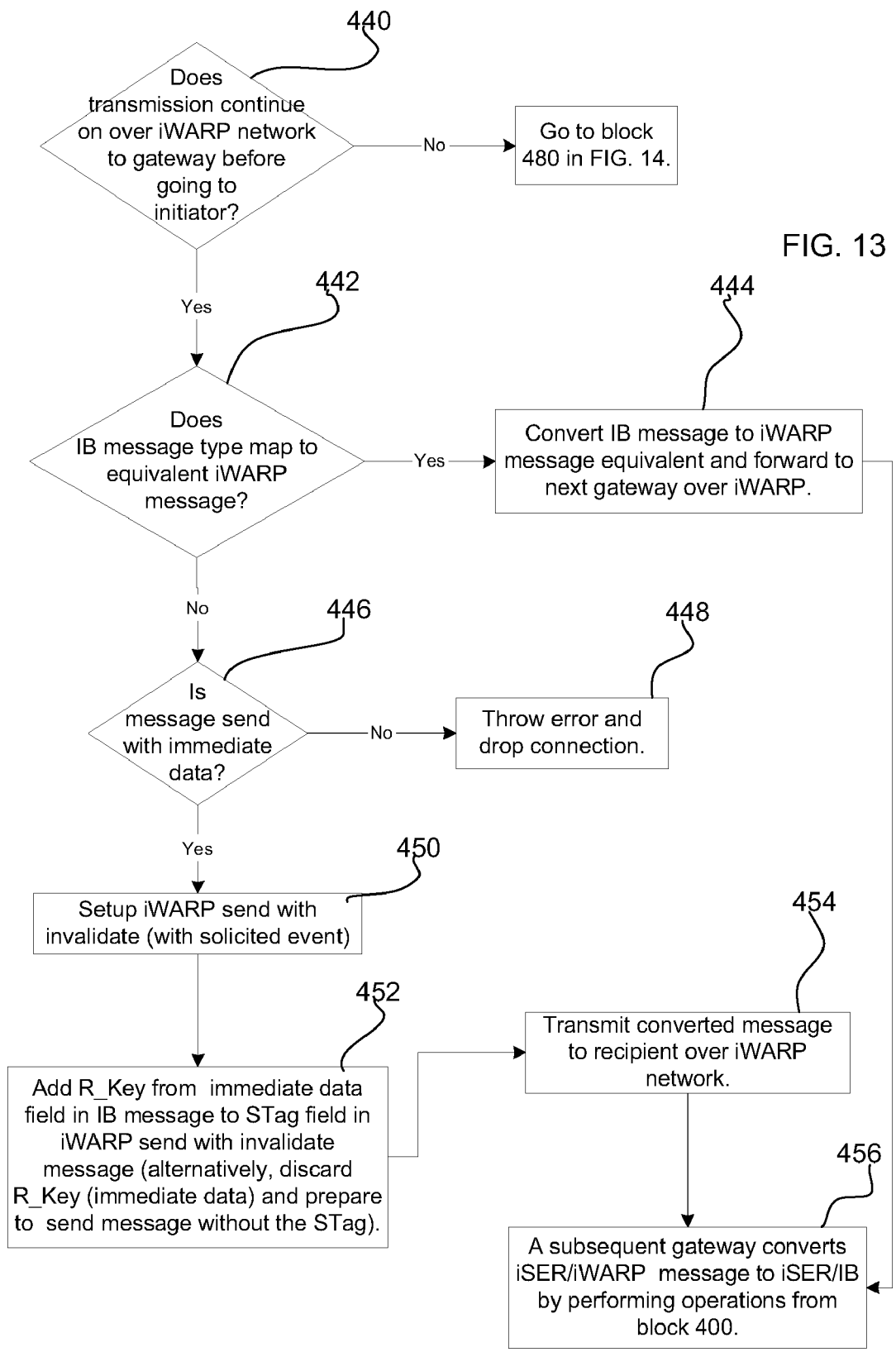
Figure 14:
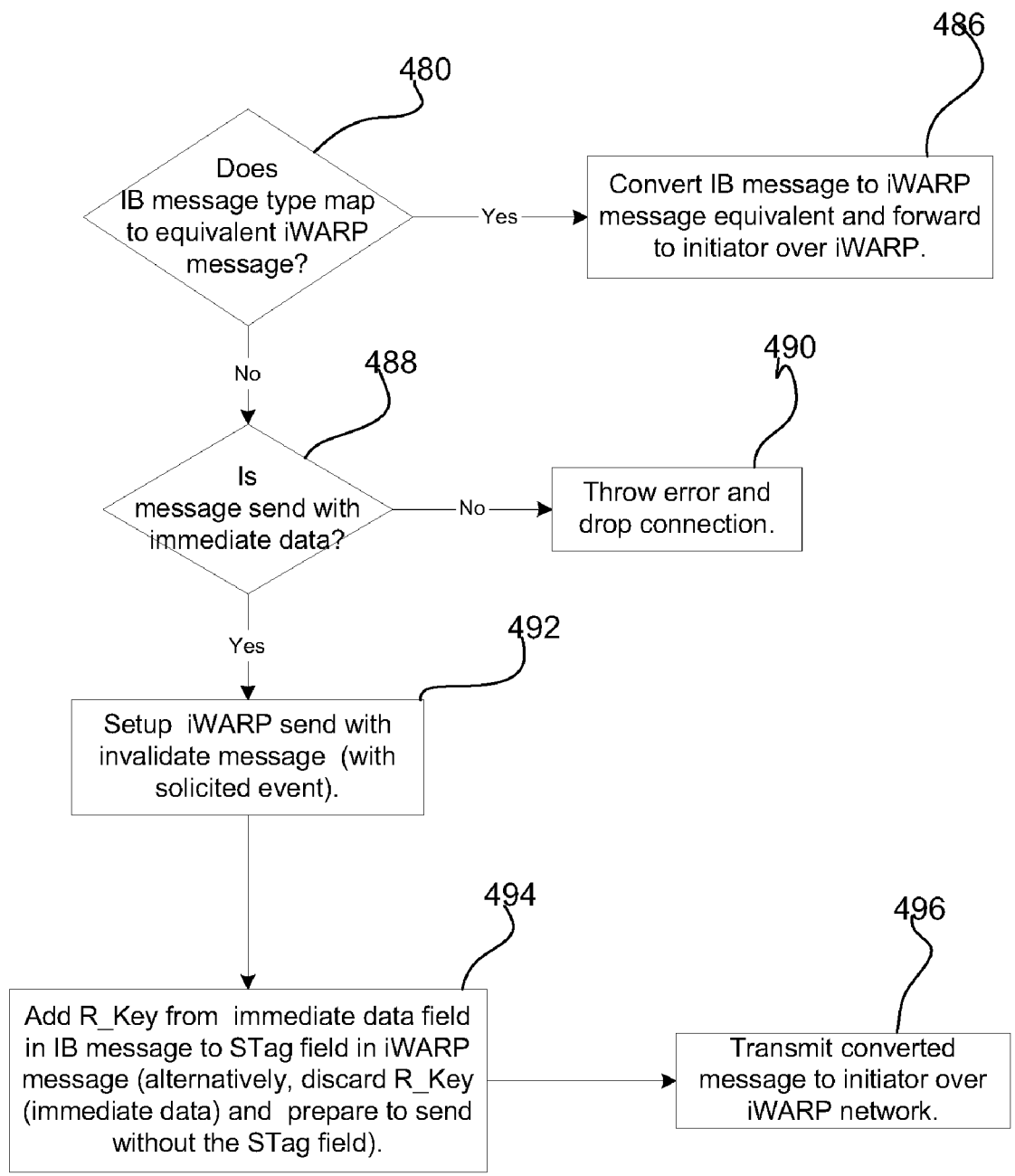

FIGS. 12, 13, and 14 illustrate operations performed by the protocol converter 314 (FIG. 9), 334 (FIG. 10), 362 (FIG. 11a), 364, 382 (FIG. 11b), and 386 to transform a message to a format compatible with the node receiving the message from a format used by the node transmitting the message implementing a protocol different from the protocol used by the node that transmitted the message. With respect to FIG. 12, the protocol converter 314, 334, 362, 364, 382, and 386 (Gateway) receives (at block 400) an iSCSI/iSER message from a target node (or from target node via another gateway node). If (at block 402) the message is from a target node (or gateway from target) using iSER/iWARP and if (at block 408) the iWARP message type maps to an equivalent InfiniBand message, then the protocol converter 314, 364 or 382 converts (at block 410) the iWARP message to the InfiniBand message equivalent and forwards the converted InfiniBand message to the initiator node, e.g., 304 or 356, (or subsequent gateway) over an InfiniBand Network. The protocol mapping 316, 336, 353, 365, 384 and 388 may provide pairs of equivalent messages in the different formats, e.g., InfiniBand and iWARP, for the protocol converter 314, 334, 362, 364, 382, and 386, which may maintain a mapping of iWARP to InfiniBand (and InfiniBand to iWARP) message types, such that the protocol mapping indicates how a message in one protocol format may be converted and map to the other protocol format. If (at block 408) the iWARP message type does not map to an equivalent InfiniBand message and if (at block 412) the message is not an iWARP send with invalidate message having an STag, then the protocol converter 314, 364, or 382 drops (at block 414) the message and throws an error because such a conversion is not handled by the protocol converter 314, 364 nor 382.

If (at block 412) the message is an iWARP "send with invalidate message" having an STag, then the protocol converter 314, 364 or 382 creates (at block 416) an InfiniBand "send with (or without) solicited event" message. The protocol converter 314, 364 or 382 adds (at block 418) the STag, referencing a direct reference to a memory location in the target or initiator, from the iWARP message to the immediate data field in the InfiniBand message (alternatively, discard STag and prepare to send without any immediate data). The protocol converter 314, 364 or 382 transmits (at block 420) the converted message to the initiator (or subsequent gateway) over the InfiniBand network. From block 410 or 420, control proceeds to block 422 where if there is a subsequent gateway, then such gateway will convert the iSER/IB message into iSER/iWARP by performing the operations from block 440 in FIG. 13.

If (at block 402) the message from the target node was in the InfiniBand protocol, then control proceeds to block 440 in FIG. 13. If (at block 440) the transmission will continue over an iWARP network to a gateway, e.g., gateway 352, before going to the initiator and if (at block 442) the InfiniBand message type maps to an equivalent iWARP message in the protocol mapping 353, then the protocol converter 362 converts (at block 444) the InfiniBand message to the equivalent iWARP message and forwards the converted message to the next gateway 354 over iWARP. If (at block 442) the InfiniBand message type does not map to an equivalent iWARP message in the protocol mapping 353 and if (at block 446) the message is not an InfiniBand "send with immediate data" message, then an error is thrown (at block 448) and the message dropped.

If (at block 446) the message is an Infiniband "send with immediate data" message, then the protocol converter 362 creates (at block 450) an iWARP send with invalidate (with solicited event) message and adds (at block 452) the R_Key from the immediate data field in the InfiniBand message to the STag field in an iWARP "send with invalidate message" (alternatively, discard R_Key (immediate data) and setup send message without the STag). The protocol converter 362 transmits (at block 454) the converted message to a gateway 354 over an iWARP network, such as shown in FIG. 11a. From block 454 or 444, a subsequent gateway may convert the iSER/iWARP message to an iSER/InfiniBand message by performing the operations from block 400.

If (at block 440) the InfiniBand transmission from the target node will not continue over an iWARP network to a gateway before going to the initiator node, (i.e., the InfiniBand message will continue through Gateway 322 or 374 on an iWARP network directly to the initiator 324 or 376 as shown in FIG. 10 and FIG. 11b, respectively), then control proceeds to block 480 in FIG. 14. If (at block 480) the InfiniBand message type maps to an equivalent iWARP message, then the protocol converter 334 or 386 converts (at block 486) the InfiniBand message to the equivalent iWARP message and forwards to the initiator over iWARP. If (at block 480) the InfiniBand message type does not map to an equivalent iWARP message in the protocol mapping 336 or 388 and if (at block 488) the message is not an InfiniBand "send with immediate data" message, then an error is thrown (at block 490) and the message dropped.

If (at block 488) the message is an Infiniband send with immediate data message, then the protocol converter 334 or 386 creates (at block 492) an iWARP send with invalidate (with solicited event) message and adds (at block 494) the R_Key from the immediate data field in the InfiniBand message into the STag field in an iWARP send with invalidate message (alternatively, discard R_Key (immediate data) and setup send message without the STag). The protocol converter 334 or 386 transmits (at block 496) the converted message to the initiator node over an iWARP network, such as shown in FIG. 10 or 11b.

Described embodiments provide a technique for allowing a message to be transmitted between networks using different communication protocols by processing and, if necessary, converting the message to a format compatible with the communication protocol used by the receiving node.

ADDITIONAL EMBODIMENT DETAILS

The embodiments described herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In the described implementations, the physical layer utilized the Ethernet protocol. In alternative implementations, alternative protocols providing link-to-link checksumming/ CRCs (or other data detecting schemes) of the packet may be used instead of Ethernet, such as Serial Advanced Technology Attachment (SATA), Infiniband, serial attached SCSI cable, etc.

In described implementations, the transport layer comprised the iSCSI protocol. In alternative implementations other protocols known in the art for transmitting I/O commands in packets and providing end-to-end checksumming/ CRCs (or other data detecting schemes) may be used.

In the described implementations, the packaged I/O commands comprised SCSI commands. In alternative implementations, the commands may be in different I/O command formats than SCSI, such as Advanced Technology Attachment (ATA).

In described embodiments, the iSCSI layer made calls to the iSER layer to access the RDMA data transfer capabilities. In additional embodiments, data transfer protocol layers other than iSCSI, such as an application or other data transfer protocols, may call the iSER layer to access RDMA data transfer capabilities.

In alternative embodiments, the IP over InfiniBand protocol (with Reliable Connections—RC) may be used instead of SDP to transmit packets encoded using a protocol, such as TCP, across an InfiniBand network. Further details on the IP over InfiniBand protocol (with Reliable Connections—RC) are described in the publication "IP over InfiniBand: Connected Mode", published by the IETF as "draft-kashyap-ipoib-connected-mode-01.txt" (September 2003), which publication is incorporated herein by reference in its entirety. For instance, the SDP layer can instead be substituted for a TCP stack layered on top of an IPoIB (RC) implementation, and any part of that TCP/IPoIB combination can be placed either within the node 2 software or the adapter 24. In such embodiments, the IPoIB (RC) function may invoke the RDMA layer 26 as needed according to the IPoIB (RC) specification.

In additional embodiments, protocols other than TCP may be used to transmit the packets over an IP capable network, such as the Stream Control Transmission Protocol (SCTP), which protocol is defined in the publication "Stream Control Transmission Protocol", RFC 2960 (Internet Society, 2000), which publication is incorporated herein by reference in its entirety.

FIGS. 5a, 5b, 6a, 6b, 7, and 8 describe specific operations occurring in a particular order. In alternative implementations, certain operations may be performed in a different order, modified or removed. Moreover, steps may be added to the above described logic and still conform to the described implementations. Further, operations described herein may occur sequentially or certain operations may be processed in parallel. Yet further, operations may be performed by a single processing unit or by distributed processing units.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. An article of manufacture comprising at least one of hardware and a computer readable storage medium having code executed to implement a first gateway and a second gateway for forwarding a message from a transmitting node to a receiving node and for performing operations, the operations comprising:

receiving, by the first gateway, a first message encoded using a first communication protocol from the transmitting node, wherein the first message includes a direct reference to a memory location in the transmitting node or the receiving node;

generating, by the first gateway, a second message compatible with a second communication protocol, wherein the second message causes the receiving node to perform an operation with respect to the direct reference in the first message;

transmitting, by the first gateway, the second message in the second communication protocol to the second gateway, wherein the receiving node is in communication with the second gateway, and wherein the receiving node uses the first communication protocol;

generating, by the second gateway, a third message compatible with the first communication protocol including the direct reference, and wherein the third message causes the receiving node to perform the operation with respect to the direct reference.

2. The article of manufacture of claim 1, wherein the first communication protocol comprises an iWARP protocol, wherein the second communication protocol comprises an InfiniBand protocol, wherein the first message comprises a send with invalidate message, wherein the direct reference comprises an STag, wherein the second message comprises a send with immediate data message, wherein the operations further comprise:

adding the direct reference STag in the first message to the immediate data field of the second message.

3. The article of manufacture of claim 1, wherein the first communication protocol comprises an iWARP protocol, wherein the second communication protocol comprises an InfiniBand protocol, wherein the first message comprises a send with invalidate message, wherein the direct reference comprises an STag, wherein the second message comprises a send without immediate data, and wherein the direct reference in the Stag of the first message is not included in the second message.

4. The article of manufacture of claim 1, wherein the first communication protocol comprises an Infiniband protocol, wherein the second communication protocol comprises an iWARP protocol, wherein the first message comprises a send with immediate data message, wherein the direct reference comprises an R_Key in the immediate data, wherein the second message comprises a send with invalidate message, wherein the operations further comprise:

adding the R_Key in the immediate data in the first message to a field of the second message.

5. The article of manufacture of claim 1, wherein the first communication protocol comprises an Infiniband protocol, wherein the second communication protocol comprises an iWARP protocol, wherein the first message comprises a send with immediate data message, wherein the direct reference comprises an R_Key in the immediate data, wherein the second message comprises a send with invalidate message, and wherein the direct reference in the R_Key of the first message is not included in the second message.

6. A system in communication with a transmitting node and a receiving node, comprising:
a first gateway and a second gateway, each having at least one of hardware and a computer readable storage medium including code to implement protocol converters;
wherein the first gateway executes the code to perform:
receive a first message encoded using a first communication protocol from the transmitting node, wherein the first message includes a direct reference to a memory location in the transmitting node or the receiving node;
generate a second message compatible with a second communication protocol, wherein the second message causes the receiving node to perform an operation with respect to the direct reference in the first message;
transmit the second message in the second communication protocol to the second gateway, wherein the receiving node is in communication with the second gateway,
wherein the receiving node uses the first communication protocol, wherein the second gateway executes the code to generate a third message compatible with the first communication protocol including the direct reference, and wherein the third message causes the receiving node to perform the operation with respect to the direct reference.

7. The system of claim 6, wherein the first communication protocol comprises an iWARP protocol, wherein the second communication protocol comprises an InfiniBand protocol, wherein the first message comprises a send with invalidate message, wherein the direct reference comprises an STag, wherein the second message comprises a send with immediate data message, wherein the first gateway further executes the code to:
add the direct reference STag in the first message to the immediate data field of the second message.

8. The system of claim 6, wherein the first communication protocol comprises an iWARP protocol, wherein the second communication protocol comprises an InfiniBand protocol, wherein the first message comprises a send with invalidate message, wherein the direct reference comprises an STag, wherein the second message comprises a send without immediate data, and wherein the direct reference in the Stag of the first message is not included in the second message.

9. The system of claim 6, wherein the first communication protocol comprises an Infiniband protocol, wherein the second communication protocol comprises an iWARP protocol, wherein the first message comprises a send with immediate data message, wherein the direct reference comprises an R_Key in the immediate data, wherein the second message comprises a send with invalidate message, and wherein the first gateway further executes the code enabled to:
add the R_Key in the immediate data in the first message to a field of the second message.

10. The system of claim 6, wherein the first communication protocol comprises an Infiniband protocol, wherein the second communication protocol comprises an iWARP protocol, wherein the first message comprises a send with immediate data message, wherein the direct reference comprises an R_Key in the immediate data, wherein the second message comprises a send with invalidate message, and wherein the direct reference in the R_Key of the first message is not included in the second message.

11. A method for forwarding a message from a transmitting node to a receiving node, comprising:
receiving, by a first gateway, a first message encoded using a first communication protocol from the transmitting node, wherein the first message includes a direct reference to a memory location in the transmitting node or the receiving node;
generating, by the first gateway, a second message compatible with a second communication protocol, wherein the second message causes the receiving node to perform an operation with respect to the direct reference in the first message;
transmitting, by the first gateway, the second message in the second communication protocol to a second gateway, wherein the receiving node is in communication with the second gateway, wherein the receiving node uses the first communication protocol; and
generating, by the second gateway, a third message compatible with the first communication protocol including the direct reference, and wherein the third message causes the receiving node to perform the operation with respect to the direct reference.

12. The method of claim 11, wherein the first communication protocol comprises an iWARP protocol, wherein the second communication protocol comprises an InfiniBand protocol, wherein the first message comprises a send with invalidate message, wherein the direct reference comprises an STag, wherein the second message comprises a send with immediate data message, further comprising:
adding the direct reference STag in the first message to the immediate data field of the second message.

13. The method of claim 11, wherein the first communication protocol comprises an iWARP protocol, wherein the second communication protocol comprises an InfiniBand protocol, wherein the first message comprises a send with invalidate message, wherein the direct reference comprises an STag, wherein the second message comprises a send without immediate data, and wherein the direct reference in the Stag of the first message is not included in the second message.

14. The method of claim 11, wherein the first communication protocol comprises an Infiniband protocol, wherein the second communication protocol comprises an iWARP protocol, wherein the first message comprises a send with immediate data message, wherein the direct reference comprises an R_Key in the immediate data, wherein the second message comprises a send with invalidate message, further comprising:
adding the R_Key in the immediate data in the first message to a field of the second message.

15. The method of claim 11, wherein the first communication protocol comprises an Infiniband protocol, wherein the second communication protocol comprises an iWARP protocol, wherein the first message comprises a send with immediate data message, wherein the direct reference comprises an R_Key in the immediate data, wherein the second message comprises a send with invalidate message, and wherein the direct reference in the R_Key of the first message is not included in the second message.

16. The method of claim 11, wherein the receiving node comprises an initiator node, wherein the transmitting node comprises a target node and wherein the first and second messages comprise a request to the initiator node to invalidate the direct reference to the memory location.

* * * * *